Oct. 1, 1935.  L. HOLLINGSWORTH  2,016,197
BOOKSTAND
Filed Dec. 4, 1934   2 Sheets-Sheet 1

Lemuel Hollingsworth
INVENTOR
BY Victor J. Evans & Co.
ATTORNEY

WITNESS:

Oct. 1, 1935.  L. HOLLINGSWORTH  2,016,197
BOOKSTAND
Filed Dec. 4, 1934  2 Sheets-Sheet 2
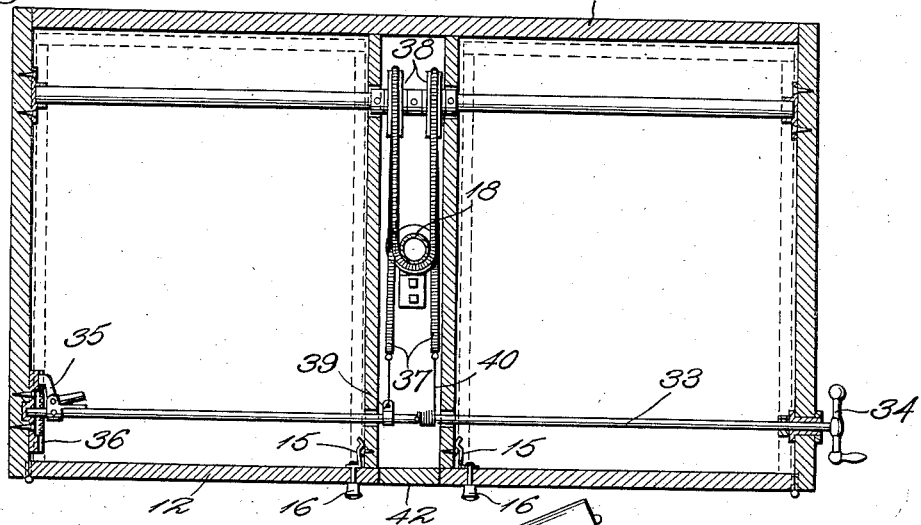
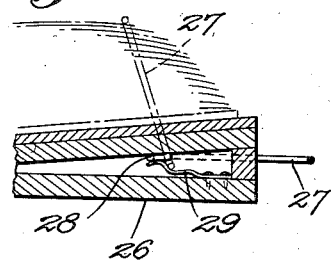
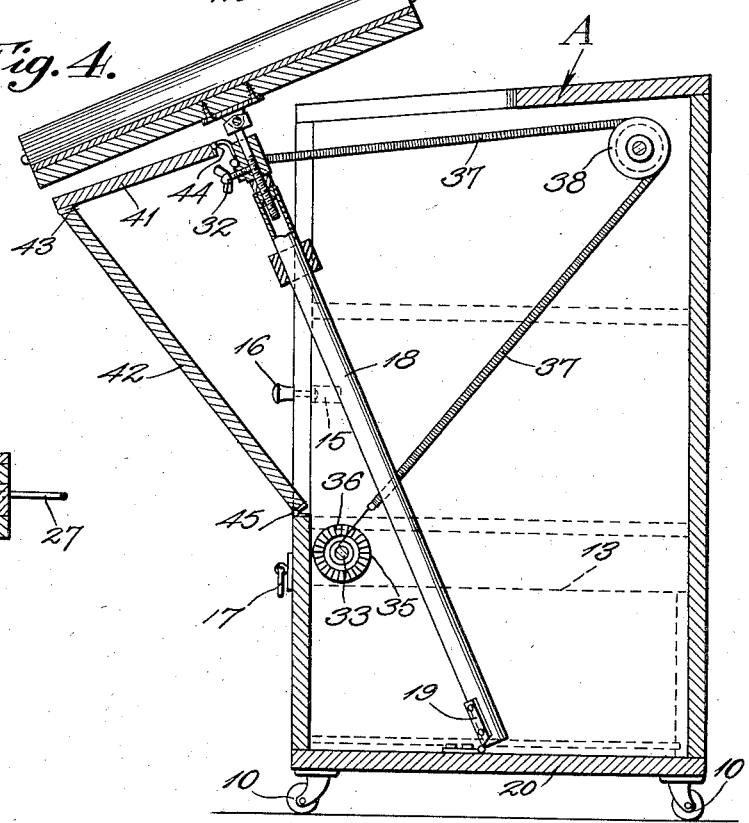
Lemuel Hollingsworth INVENTOR Patented Oct. 1, 1935

2,016,197

UNITED STATES PATENT OFFICE 2,016,197

BOOKSTAND

Lemuel Hollingsworth, Oakland, Ark.

Application December 4, 1934, Serial No. 755,951

3 Claims. (Cl. 45—60)

The invention relates to a book stand and more especially to an adjustable stand for books.

The primary object of the invention is the provision of a stand of this character, wherein the book rest is mounted so as to swing toward or away from a reader of a book when held thereby and thus eliminating the requirement for the handling of the book, particularly with regard to books of large size, the book being held in a novel manner and susceptible of being raised or lowered with respect to the stand.

Another object of the invention is the provision of a stand of this character, wherein the book rest is swingingly supported and is susceptible of being raised and lowered to suit the convenience and fancy of the reader of the book, the stand being adaptable for accommodating books of large volume, the said stand being also adaptable for the holding of maps for the convenient reading thereof.

A further object of the invention is the provision of a stand of this character, which is extremely simple in its make-up, thoroughly reliable and efficient in its purpose, affording ease and convenience to a reader of a book when held thereby, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 3 is a horizontal sectional view through the stand.

Figure 4 is a view similar to Figure 2 on an enlarged scale and taken on the line 4—4 of Figure 1, looking in the direction of the arrows.

Figure 7 is a fragmentary vertical sectional view through the book rest, showing the leaf retaining yoke for the book when upon the rest.

Similar reference characters indicate corresponding parts throughout the several views in the drawings.

Figure 1:
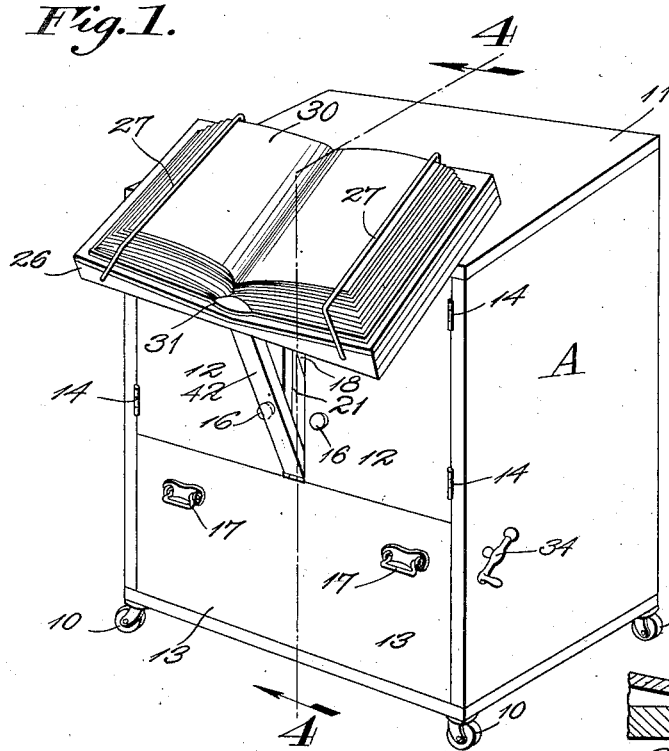
Figure 1 is a perspective view of a stand constructed in accordance with the invention, showing a book at rest thereon.
Figure 6:
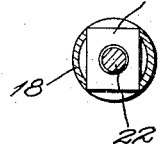
Figure 6 is a sectional view on the line 6—6 of Figure 5.
Figure 5:
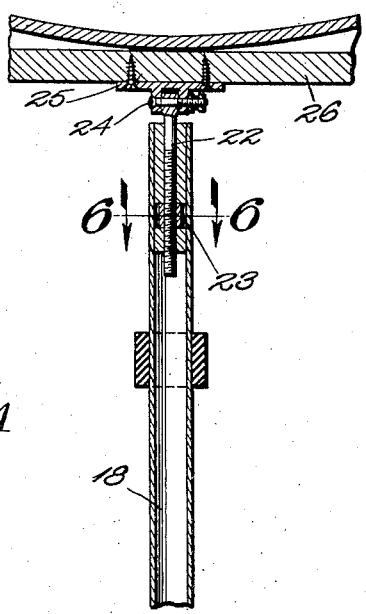
Figure 5 is a fragmentary enlarged vertical sectional view through the book rest.
Figure 2:
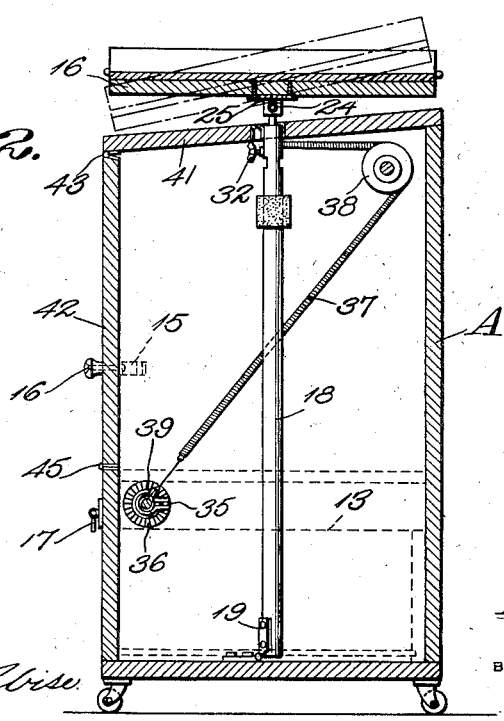
Figure 2 is a vertical longitudinal sectional view through the stand, showing by full lines one position of the book rest and by dotted lines an adjusted position thereof.

Referring to the drawings in detail, the stand comprises a cabinet-like body A supported upon casters 10 and having the slightly inclined top 11, while at the front of the body A are upper swinging doors 12 and also sliding drawers 13. The doors 12 are supported by hinges 14 fixed to the sides of the body A and are held in closed position by spring latches 15, the doors and drawers being fitted with hand knobs 16 and handles 17, respectively, for convenience in the handling thereof.

Swingingly arranged within the body A at the transverse median thereof is a tubular post 18 which, at its lower end, is hinged, at 19, to the bottom or base 20 of the body A and is adapted to swing vertically in a forward and backward direction through a suitable slot or cutaway portion 21 as provided in the top and front of the body A.

Fitted in the upper end of the post is a threaded stem 22, it being engaged in a nut 23 fitted within said post so that on the turning of the stem 22 it can be adjusted. This stem is bolted, at 24, to a bearing or bracket 25 carrying a book rest 26, the latter being susceptible of angular adjustment and through the medium of the post 18 can be swung forwardly or backwardly with relation to the stand body A.

Carried by the book rest 26 are wire bails or yokes 27, these being swingingly supported, and through the medium of the cranked ends 28 cooperating with spring keepers 29 the said bails or yokes can be latched in their adjusted position. On the swinging of the bails over the leaves 30 of a book 31 the said leaves will be prevented from turning and thus eliminating inconvenience in the reading of the book when upon the rest. When it is desired to turn the leaves 30 the bails or yokes 27 can be swung outwardly in a lateral direction for the freeing of such leaves of the book and thereafter the said bails or yokes 27 will be brought to the position as shown in Figure 1 of the drawings for the holding of the leaves of the book against turning.

The post is fitted with a set screw or winged clamping bolt 32 which engages the stem 22 to hold the same adjusted relative to the post 18. It should be obvious that by turning the stem 22 the book rest 26 can be elevated or lowered at the option of the user of the stand.

Journaled transversely in the lower portion of the body A is a rotatable shaft 33 which is formed with a hand crank 34 located exteriorly of the body A and also carries a hand-releasable ratchet dog 35 coacting with a ratchet toothed keeper disk 36, the same being suitably fixed with one of the bearings for the shaft and disposed with its ratchet teeth concentrically about the said shaft, so that the latter will be latched in a selected position on rotation thereof.

Looped about the post 18 at its upper end is a coiled spring cable 37 which is trained over guide pulleys 38 and has one end, through the connection 39, loosely engaged on the shaft 33, while through the connection 40 the other end of said cable is adapted to be wound on and unwound from the said shaft 33, and in this fashion the post 18 is adjusted angularly or to a perpendicular position, thus locating the book rest 26 at the desired forward inclination, answering the requirements of a reader of the book when upon the rest.

The stand is adaptable for use in libraries, churches and offices as it supports books of large volume or what may be stated as large books, thus eliminating the necessity of manual handling of the book during reading thereof or when having reference thereto, as for example, encyclopedias, dictionaries, Bibles or other books, the stand being equally adaptable for holding maps for the reading of the same.

Arranged within the slot or cutaway portion 21 in the top and front of the body A is a closure which includes the sections 41 and 42, respectively, these being connected together by a hinge 43, and the section 41 is hinged to the post 18, at 44, while the section 42 is hinged to the front at the bottom of the slot or cutaway portion therein, as at 45, and this closure serves to close the said cutaway portion when the post 18 is in perpendicular or vertical position, so as to conceal the cutaway portion when the said post is in the normal vertical position. Upon swinging of the post 18 the sections 41 and 42, by reason of their hinged connections, will move outwardly of the slot or cutaway portion so as not to interfere with the swinging of the post 18 therein.

What is claimed is:

1. A stand of the character described comprising a body having a swinging post arranged therein and extended without the same, an adjustable book rest carried by said post, means for adjusting the post arcuately in a vertical direction, leaf holders carried by the rest, and means for raising and lowering of the book rest with respect to the post.

2. A stand of the character described comprising a body having a swinging post arranged therein and extended without the same, an adjustable book rest carried by said post, means for adjusting the post arcuately in a vertical direction, leaf holders carried by the rest, means for raising and lowering of the book rest with respect to the post, and means for latching the first-named means on adjustment thereof.

3. A stand of the character described comprising a body having a slot in a portion of its top and front, a post swingingly arranged within the body and movable through the slot to extend outwardly of said body, an adjustable book rest carried by said post, means for adjusting the post arcuately in a vertical direction, leaf holders carried by the rest, means for raising and lowering of the book rest with respect to the post, and means for latching the first-named means on adjustment thereof.

LEMUEL HOLLINGSWORTH.